(12) United States Patent
Nuovo

(10) Patent No.: US 6,781,925 B2
(45) Date of Patent: Aug. 24, 2004

(54) PORTABLE COMMUNICATION DEVICE

(75) Inventor: Frank Nuovo, Los Angeles, CA (US)

(73) Assignee: Nokia Mobile Phones Ltd., Espoo (FI)

( * ) Notice: Subject to any disclaimer, the term of this patent is extended or adjusted under 35 U.S.C. 154(b) by 575 days.

(21) Appl. No.: 09/891,631

(22) Filed: Jun. 25, 2001

(65) Prior Publication Data

US 2002/0050981 A1 May 2, 2002

Related U.S. Application Data

(63) Continuation-in-part of application No. 09/653,393, filed on Sep. 1, 2000, now Pat. No. 6,484,020.

(51) Int. Cl.$^7$ .................................................. H04B 1/20

(52) U.S. Cl. ...................... 369/11; 455/556.1

(58) Field of Search .............................. 369/1, 4, 7, 10, 369/11, 29.02; 455/556.1, 556.2, 550, 550.1, 572, 557, 90.3; 379/433, 434, 58

(56) References Cited

U.S. PATENT DOCUMENTS

| | | | | |
|---|---|---|---|---|
| 5,303,291 A | * | 4/1994 | Takagi et al. | 455/557 |
| 5,606,594 A | * | 2/1997 | Register et al. | 455/556.2 |
| 5,924,044 A | * | 7/1999 | Vannatta et al. | 455/556.1 |
| 6,427,078 B1 | * | 7/2002 | Wilska et al. | 455/556.1 |

* cited by examiner

*Primary Examiner*—Thang V. Tran
(74) *Attorney, Agent, or Firm*—Jubin Dana; Steven A. Shaw

(57) ABSTRACT

A communication device including control circuitry with transceiver capabilities, input keys coupled to the circuitry for entering information, a display coupled to the circuitry for visual presentation of information, a chassis for securely holding the circuitry and the display, a sound generation unit coupled to the circuitry for providing audio presentation of information, and an interface unit including a speaker unit and an antenna unit, wherein the interface unit is removable. The interface unit can be removed and replace with other interface units including various other functions and features, such as multimedia, gaming, storage, and interface specific activation of devices.

7 Claims, 4 Drawing Sheets

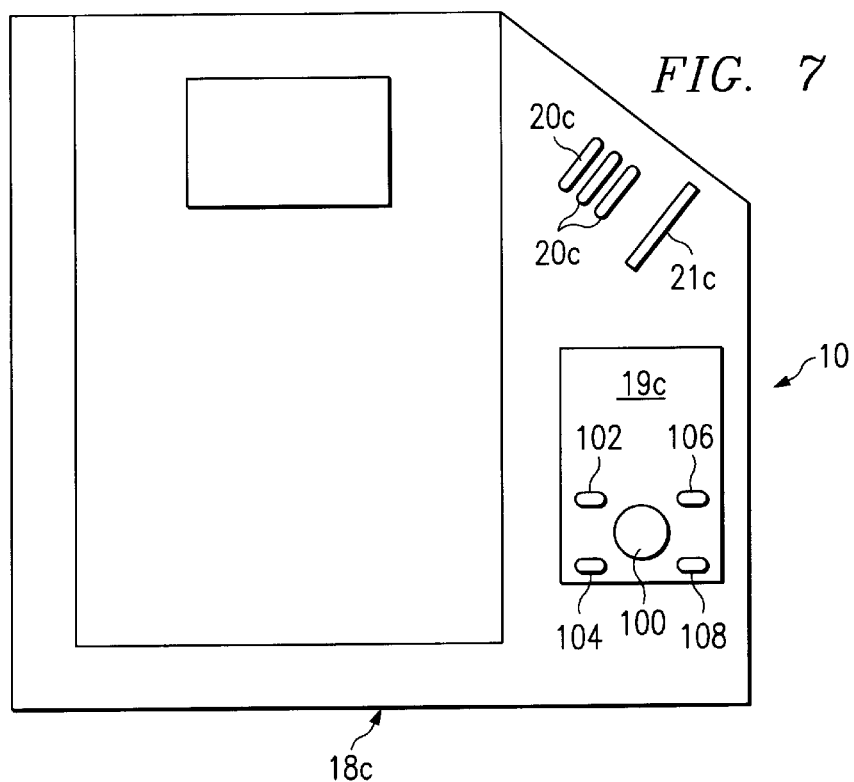
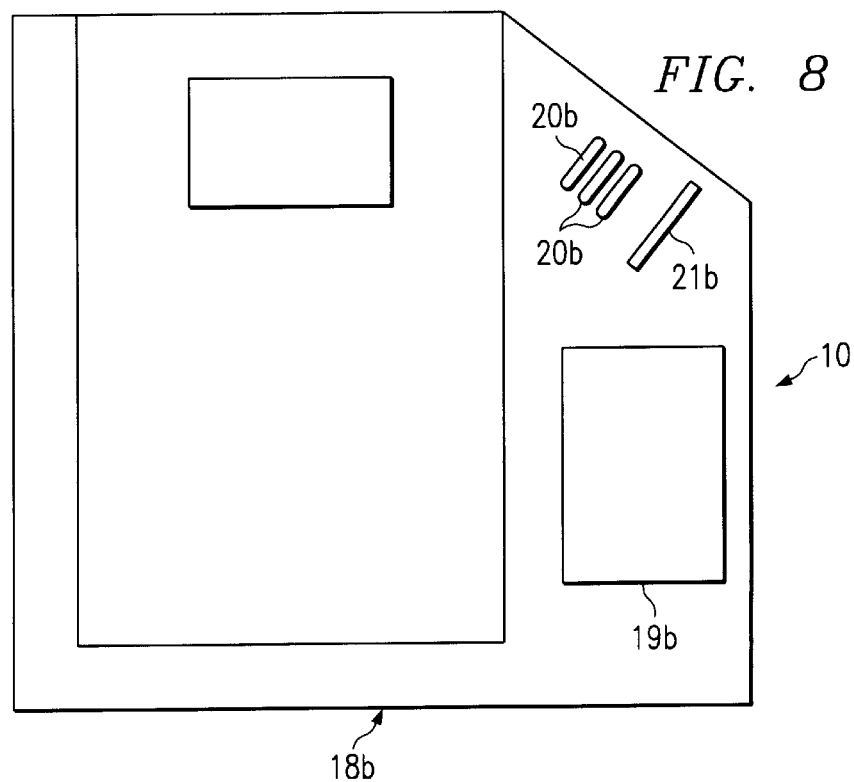

US 6,781,925 B2

PORTABLE COMMUNICATION DEVICE

CROSS REFERENCE

This is a continuation in part of and claims benefit under 35 U.S.C. 120 to U.S. patent application Ser. No. 09/653,393, filed on Sep. 1, 2000, now U.S. Pat. No. 6,484,020 issued on Nov. 19, 2002.

BACKGROUND

This invention relates to portable communication devices, and more specifically to a multimedia portable communication device with a modular attachable units.

In general, portable communication devices have several common components, such as a transmission and receiving units, which may also be referred to as a transceiver unit, that are controlled by circuitry, an input device coupled to the circuitry, a display unit coupled to the circuitry, and a microphone type receiver unit and a sound generation units working in conjunction with the transceiver unit. For example, known forms of generating sound in a portable communications device include the use of a speaker fixed in position, typically above the display unit, with the microphone unit located at an opposite end from the sound generating unit. Each speaker unit requires a minimum volume of air for proper operation.

In addition to the common elements that exist in the portable communication devices, there are various other features that user desire. For example, some users prefer to have internet access while other users prefer gaming features; some user prefer to store and listen to music while others prefer to store personal management information. Thus, one challenger that manufactures of these devices is how to provide all of these features and functions in a single device while still creating a compact and slim device.

Therefore, what is need is a portable communication device that is capable of providing all of the features and functions desired by the spectrum of users through one portable device.

SUMMARY

A slim and compact portable communication device is disclosed that provides users with a variety of features and functions.

A communication device including control circuitry with transceiver capabilities, input keys coupled to the circuitry for entering information, a display coupled to the circuitry for visual presentation of information, a chassis for securely holding the circuitry and the display, a sound generation unit coupled to the circuitry for providing audio presentation of information, and an interface unit including a speaker unit and an antenna unit, wherein the interface unit is removable. The interface unit can be removed and replace with other interface units including various other functions and features, such as multimedia, gaming, storage, and interface specific activation of devices.

BRIEF DESCRIPTION OF THE DRAWINGS

FIG. 7 is a perspective illustration of another embodiment of the device as shown in FIG.

FIG. 8 is a perspective illustration of another embodiment of the device as shown in FIG. 1.

DETAILED DESCRIPTION

Figure 1:
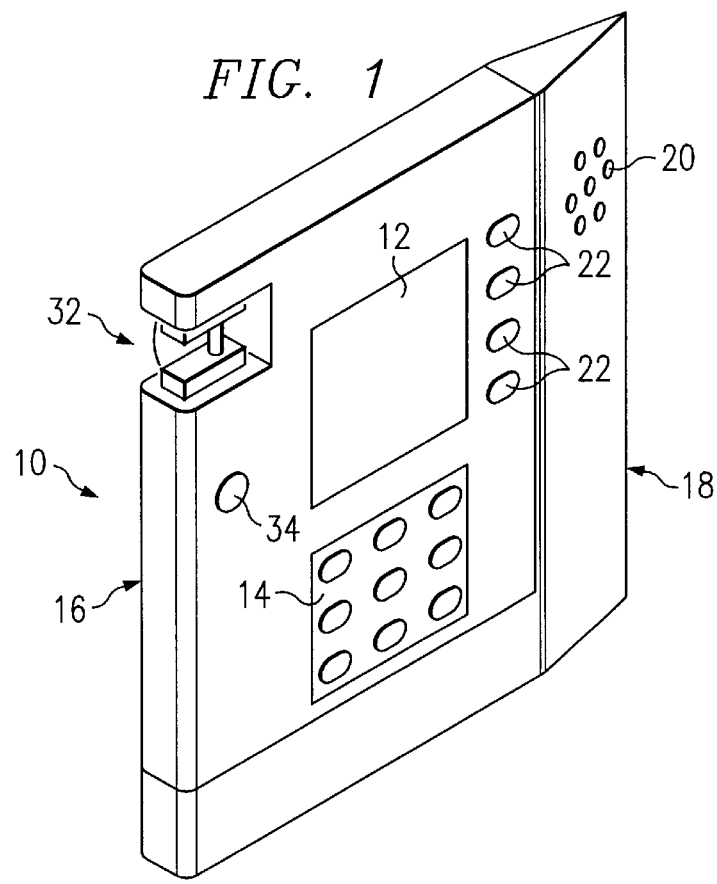
FIG. 1 is a perspective elevation of a device in accordance with the teachings of the present invention.
Figure 2:
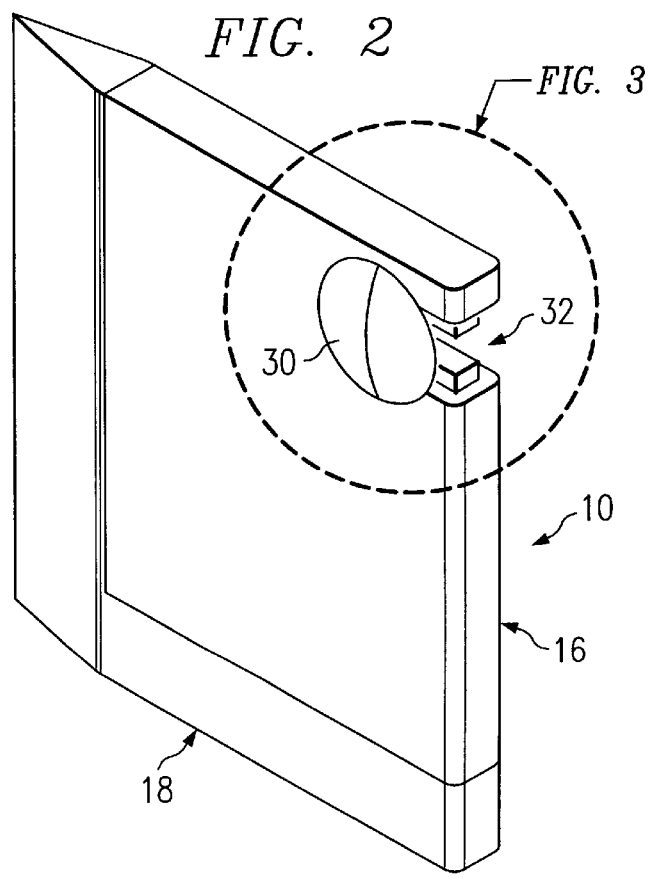
FIG. 2 is a perspective elevation of the opposite side of the device of FIG. 1 showing an ear bud.

Referring now to FIGS. 1 and 2, a portable communication device 10 includes a display unit 12 coupled to control circuitry and a keypad style input device 14 fixed to a chassis 16.

An interface unit 18 is removably attached to the chassis 16. The interface unit 18 can be made of a variety of materials, including elastomeric type materials to provide improved gripping features. In addition to providing improved gripping features, the interface unit 18 is coupled to the control circuitry, which is internal to the device 10, and contains a sound generating or speaker unit 20 and an antenna unit 21 (as can be seen on FIG. 6). Although the speaker unit 20 is shown in a circular pattern and at a specific location, the scope of the invention, as set forth herein and claimed hereafter, is not limited thereby. Likewise, the location, shape, and orientation of the antenna unit 21 is for illustrative purposes and not intended as a limitation. For example, the antenna unit 21 can have various different locations, shapes, and orientations.

Soft keys 22 are included in close proximity to the display 12. The soft keys 22 derive their function from the information displayed on the screen. The information can be varied so that in one instant any particular soft key 22 can be pressed for one function and then at another instant that same soft key 22 can be pressed for an entirely different function as determined by the information displayed on the display 12.

Figure 4:
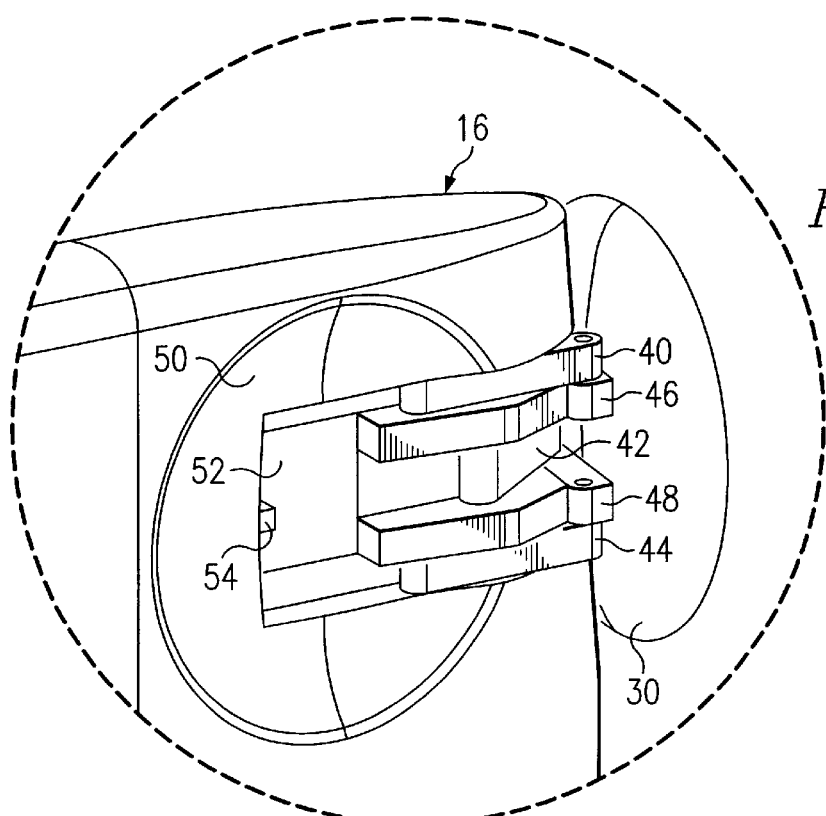
FIG. 4 is a more detailed perspective view of the device of FIG. 1 with the ear bud in the active or open position.

Referring specifically to FIG. 2, a deployable speaker unit or ear bud 30 is movably secured to the chassis 16 of the device 10. The ear bud 30 is shown in the parked position. The term "parked position" refers to or means that the ear bud 30 is in the closed position or the inactive position; this is the position in which the ear bud 30 is stored when not in use. The chassis 16 further defines an opening 32. The opening 32 allows the ear bud 30 to move from the parked position to the activated position, as shown in FIG. 4 and discussed in detail below. Thus, when the user of the device 10 receives and incoming call or desires to make an outgoing call, then the user has a choice of either using the speaker unit 20 or the ear bud 30. If the user chooses to use the ear bud 30 to carry out the call, then the user presses a release button 34 to cause the ear bud 30 to move from the parked position of FIG. 2 to a deployed or an active position of FIG. 4. The term "deployed" refers to or means that the ear bud 30 is in the open or active position; this is the position of the ear bud 30 when the ear bud 30 is being used to conduct a call.

Figure 3:
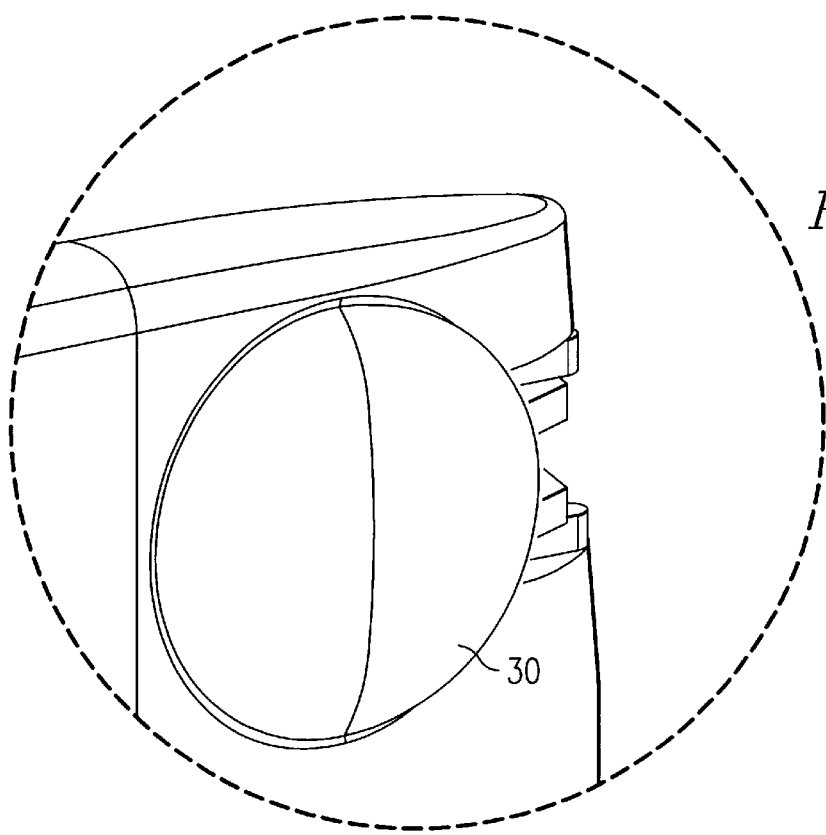
FIG. 3 is a more detailed perspective view of the device of FIG. 1 with the ear bud in the inactive or closed position.

Referring now to FIGS. 3 and 4, in an embodiment of the present invention, the ear bud 30 rotates or pivots about hinge arms 40, 42, and 44 and retainably pivots about guide arms 46 and 48. Although the terms "rotating" or "pivoting" is used in reference to the motion from the parked position to the deployed position, the invention is not limited thereby; the intent is to set forth and describe the concept of moving the ear bud 30 from a first position to a second position or as already mentioned to move from the parked position to the active position and back again irrespective of the label used or describe the motion. The chassis 16 defines an indentation 50 for matingly retaining the ear bud 30 in the parked position. The indentation 50 further defines a recess 52 for receiving the arms 40, 42, 44, 46, and 48. It will be apparent to those skilled in the art that the defined shape of the recess 52 can be varied. Furthermore, the defined shape of the recess 52 is defined by the geometry of the arms of the ear bud and not limited to the shape disclosed herein.

With the ear bud 30 in the parked position, the user will depress the button 34, (as is shown in FIG. 1), to cause the ear bud 30 to move from the parked position to the deployed position. In one embodiment, the button 34 can be specifically designated for the deployment and the retraction of the of the ear bud 30. In an alternative embodiment the function of the button 34 can be incorporated into or as a part of the function of another button. For example, the function of the button 30 can be incorporated into the function of a typical "send" or "talk" key such that when the user presses the "send" or "talk" key the ear bud 30 is deployed from the parked position. It will be apparent, based on the teachings of the present invention, that the disclosure set forth herein is not limited by the key or the type of function of a key with which the function of the button 34 is combined.

For clarity the discussion herein will focus on the button 34 specifically designated to deploy the ear bud 30 from the parked position to the deployed position. Once the user presses the button 34, the ear bud 30 moves from the parked position to the deployed position. In one embodiment, the ear bud 30 moves from the parked position to the deployed position under spring tension. As the user moves the ear bud 30 from the deployed position to the parked position, the guide arms 46 and 48 cause a spring or tension rod to be compressed. Alternatively or additionally, the hinge arms 40, 42, and 44 can also be spring-loaded. Once the ear bud 30 is moved to the parked position a latch mechanism 54, which is coupled to and operated by the button 34, is engaged to retain the ear bud 30 in the parked position under tension. Thus, when the button 34 is pressed, the latch mechanism 54 is activated to release the ear bud 30 and the ear bud 30 is released such that the tension of the spring or rod forces the ear bud 30 to move from the parked position to the deployed position. In addition to spring loading the ear bud 30, a dampening unit can be included to control the speed at which the ear bud 30 moves from the parked position to the deployed position under tension.

Alternatively or additionally, a motor unit can be included to move the ear bud 30 from the parked position to the deployed position. The motor unit is activated when the user presses the button 34 thereby causing the ear bud to be released from the parked position and then moved, under the control of the motor unit, from the parked position to the deployed position. The motor unit can be coupled to guide arms 46 and 48. Alternatively or additionally, the motor unit may be coupled to the hinge arms 40 and 44.

Generally stated, when in the deployed position the tension of the spring or the gearing of the motor unit is used to prevent motion of the ear bud 30 back toward the parked position. However, various locking mechanisms can be used to securely lock the ear bud 30 in the deployed position and prevent motion toward the parked position until the locking mechanism for the deployed position is released. The locking mechanism for the deployed position can be coupled to the button 34. Alternatively, the locking mechanism for the deployed position can be coupled to the "end" key, such that when the user presses the "end" key the call session is terminated and the ear bud is released for return to the parked position; this can be set up to allow one press to terminate the call and release the locking mechanism for the deployed position or, alternatively, have a first press to terminate the call and a second consecutive presses to release the locking mechanism for the deployed position, which is similar to the double clicking feature of a mouse for a computer.

Figure 5:
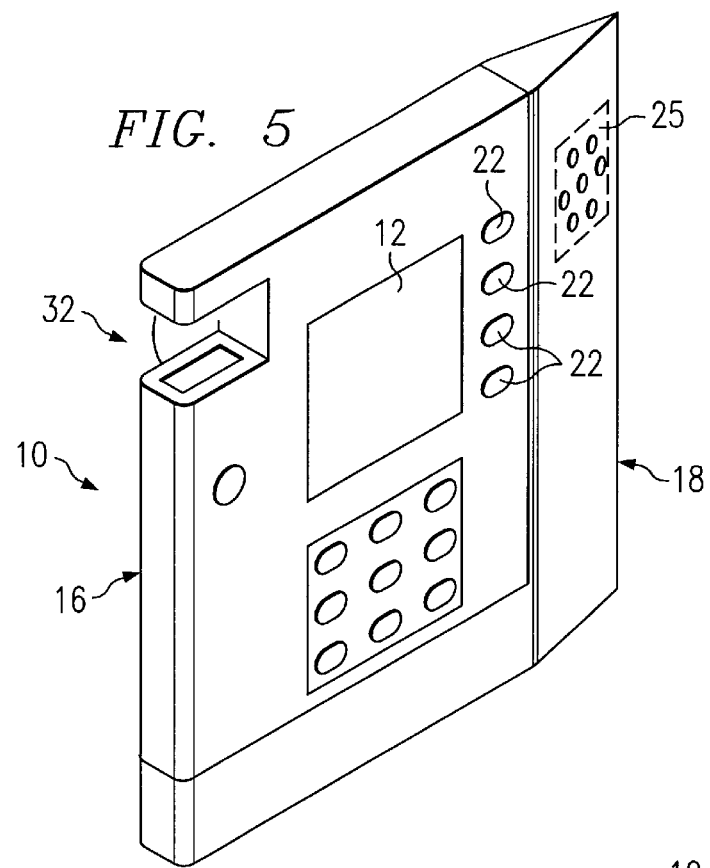
FIG. 5 is a perspective illustration of another embodiment of the device as shown in FIG. 1.
Figure 6:
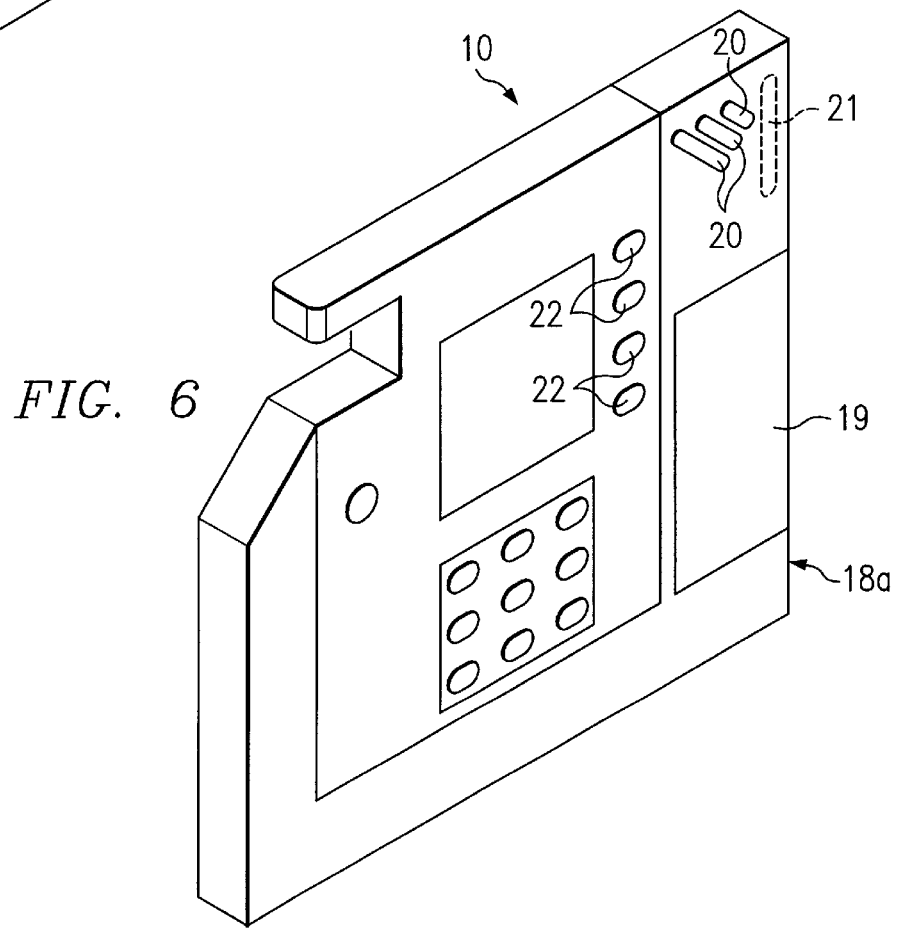
FIG. 6 is a perspective illustration of another embodiment of the device as shown in FIG. 1.

Referring now to FIGS. 5 & 6, in another embodiments, the antenna unit 21 and the speaker unit 20, of FIG. 1, may be co-located so that the speaker unit 20 and the antenna unit 21 share a common air/space volume resulting in a antenna-speaker unit 25. In addition to containing the antenna-speaker unit 25 or the antenna 21 and the speaker unit 20, the interface unit 18 may be replaced by another interface unit, as discussed in detail below, to provide a variety of features and functions.

Referring now to FIG. 6, the interface unit 18 is replaced by the interface unit 18a. In addition to a speaker unit 20 and an antenna unit 21, the interface unit 18a includes a driver unit 19. The driver unit 19 is capable of accepting and reading a compact disk (CD) type of storage medium, such as a CD-ROM. Furthermore, the driver unit 19 can record information on a CD type device as needed. Although the function or reading and recording are discussed as a part of a single unit, it is contemplated that the device will be capable of performing these functions independently or individually. Additionally, it is contemplated that the interface unit 18 can be replaced by other interface units that include features such as special entertainment modules that interface with the control circuitry for enhance entertainment, such as gaming or DVD type interfaces.

Referring now to FIG. 7, the device 10 includes an interface unit 18b that includes a speaker unit 20b and an antenna unit 21b. The interface unit 18b also includes a player unit 19b. The player unit 19b is capable of receiving, recording, and playing audio data files, such as musical data files, voice data, and any other form of audio file. The player unit 19b is coupled to the control circuitry of the device 10 and allows the user to select, record, and/or play audio-type of data.

Referring now to FIG. 8, an interface unit 18c includes a speaker unit 20c and an antenna unit 21c. The interface unit 18c also includes a gaming unit 19c. The gaming unit 19c includes a omni-directional input device 100 and a plurality of input buttons 102, 104, 106, and 108. The gaming unit 19c can store a variety of gaming features. Additionally, the gaming unit 19c is capable of interfacing with various gaming devices.

Although the interface units are discussed in terms of specific functions, the interface unit can be used to activate special features and functions of the device 10. For example, if the device 10 was shares among several users, then each user could have an interface unit that is specially coded for that specific users. Thus, when the user engages her or his interface unit, the device 10 can recognize the user and, hence, bring up a special menu or feature unique to that user. Furthermore, access to the unique features can be limited to the specific interface unit. Alternatively, the a user can have several interface units, each of which incorporate a unique feature or function. Furthermore, the interface unit may incorporate some power source to extend the talk time and standby time of the device 10.

Various other devices or mechanisms are contemplated for the motion of the ear bud 30 from the parked position to the deployed position.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter.

What is claimed is:

1. A communication device comprising:

a chassis;

control circuitry secured to the chassis, wherein the circuitry includes transceiver capabilities;

input keys coupled to the circuitry for entering information, a display coupled to the circuitry for visual presentation of information;

a sound generation unit coupled to the circuitry for generating audible sound, wherein the sound generating unit moves from a first position to a second position; and an interface unit removably secured to the chassis, wherein the interface unit includes a speaker unit and an antenna unit.

2. The communication device of claim 1 further comprising a retaining unit secured to the chassis for releasable retaining the sound generation unit in the inactive position, wherein the retaining unit is operated by a button such that pressing the button causes the retaining unit to disengage from and release the sound generation unit thereby allowing the sound generation unit to move from the inactive position to the active position.

3. The communication device of claim 2 wherein the inactive position is in a first plane and the active position is in a second plane, such that the first and second planes intersect.

4. The communication device of claim 2, further comprising a locking mechanism coupled to the button for retaining the sound generation unit in the active position.

5. The communication device of claim 2 wherein the sound generation unit is rotatebly and pivotally deployed from the inactive position to the active position.

6. The communication device of claim 1, wherein the interface unit further comprises a multimedia device coupled to the circuitry capable of reading from and storing data onto an external storage device.

7. The communication device of claim 1, wherein the sound generation unit comprises:

a slide including a hinge movable retained in a first plane by the chassis; and a speaker unit secured to the slide, wherein the slide is partially deployed and then moves about the hinge to the active position in a second plane.

\* \* \* \* \*